March 21, 1961 P. J. DE PASQUALE 2,975,732
METHOD OF PRODUCING FROZEN COMESTIBLES
Original Filed Sept. 20, 1957
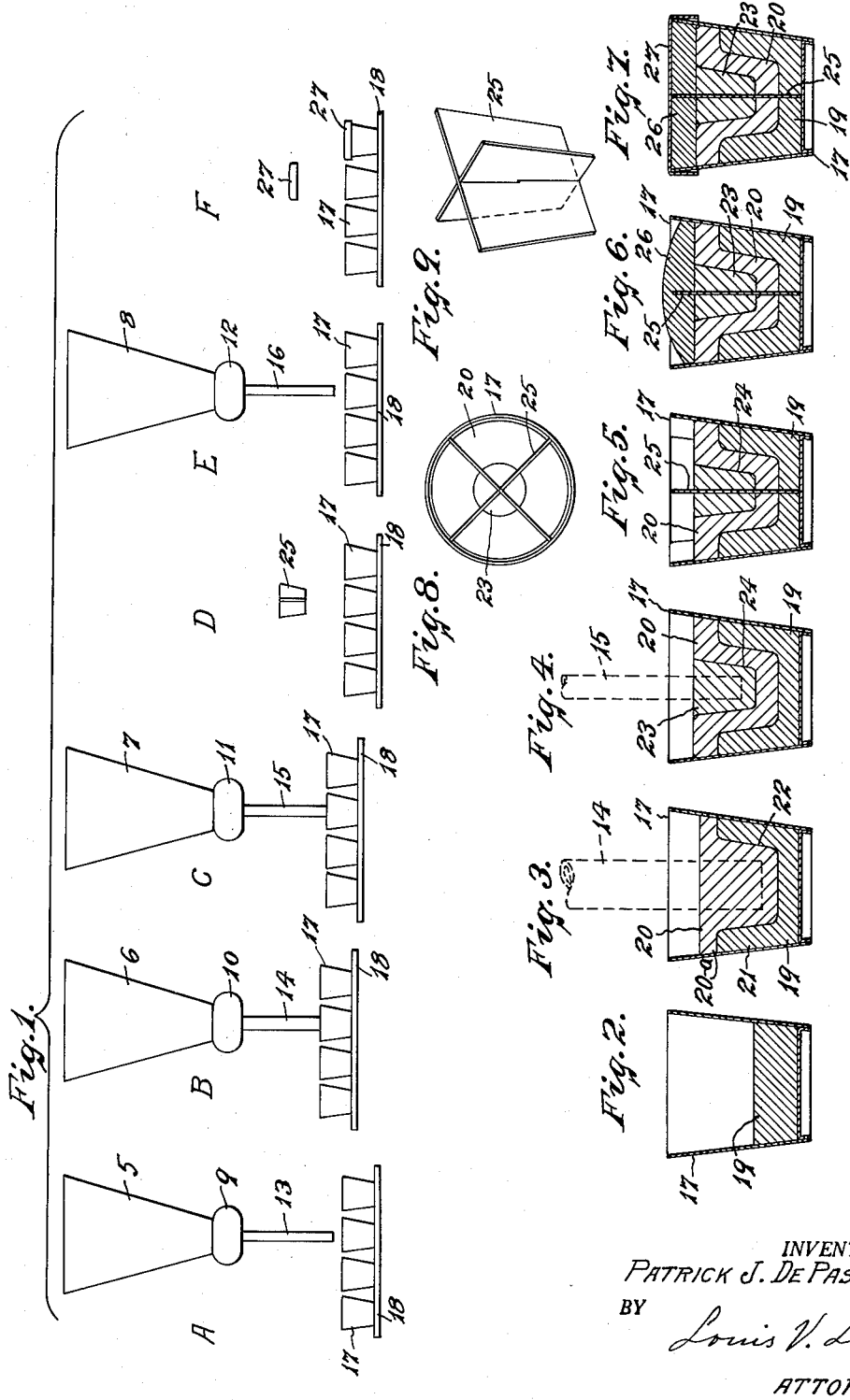
INVENTOR.
PATRICK J. DE PASQUALE.
BY
*Louis V. Lucia*
ATTORNEY.

ically related to it. The method also the containers are moved to the next station E in which the

United States Patent Office 2,975,732
Patented Mar. 21, 1961

2,975,732

METHOD OF PRODUCING FROZEN COMESTIBLES

Patrick J. De Pasquale, 221 Grandview Terrace, Hartford, Conn.

Continuation of application Ser. No. 685,156, Sept. 20, 1957. This application Feb. 3, 1960, Ser. No. 6,564

3 Claims. (Cl. 107—54)

This invention relates to a method of producing frozen comestibles, such as ice cream and the like, and more particularly for producing spumoni ice cream which commonly consists of a plurality of layers of frozen, contrasting, edible material as fully described in my United States Patent No. Re. 24,299, dated April 2, 1957. The present application is a continuation of my co-pending application Serial No. 685,156, filed September 20, 1957, now abandoned, also entitled a Method of Producing Frozen Comestibles.

An object of this invention is to provide an improved method of producing spumoni ice cream directly in the container therefor in a highly efficient and economical manner.

A further object of this invention is to provide a highly efficient and sanitary method for producing spumoni ice cream in individual containers without being touched by human hands.

A still further object of this invention is to provide a method for producing a comestible articles in individual containers and for dividing the articles in such a manner that they may be easily separated into a plurality of servings after having been removed from the container.

Further objects and advantages of this invention will be more clearly understood from the following description and the accompanying drawings in which:

Fig. 1 is a schematic view of a production line in which spumoni ice cream is produced in accordance with the method of this invention.

Fig. 2 is a sectional side view of a container with material therein illustrating the first step of my improved method.

Fig. 3 is a similar view illustrating the manner in which the second layer of material is formed by my improved method.

Fig. 4 is a similar view illustrating the manner in which the third layer, or core, of the article is formed by my improved method.

Fig. 5 is a similar view illustrating the manner in which the article is separated into a plurality of sections.

Fig. 6 is a similar view illustrating the first step in forming a top layer of the material by my improved method.

Fig. 7 is a similar view showing the completed article produced by said method.

Fig. 8 is a plan view of the container with the material and separator therein as illustrated in Fig. 5.

Fig. 9 is a perspective view of the divider for dividing the article produced by my improved method.

As shown in Fig. 1, the letters A, B, C, D, E and F denote stations in a conveyor system, or suitable production line, in which the different steps of my improved method are performed, and the numbers 5, 6, 7 and 8 denote hoppers for comestible material, such as ice cream, of different flavors and colors which are separately contained in said hoppers in partially congealed form. The said stations respectively include suitable pumps 9, 10, 11 and 12 for forcing the material from their respective hoppers through suitable spouts in the form of tubes 13, 14, 15 and 16, respectively. These pumps may be operated by electric motors which may be controlled by foot switches, or in any other suitable manner, for delivering a desired quantity of the material in the respective hoppers. If desired, the said pumps may be of a type operable to deliver a predetermined amount of the material at each operation of the pump.

In producing a spumoni by my improved method, a plurality of containers 17 are first placed upon a suitable tray 18 and progressively carried through the stations shown in Fig. 1 for the performance of the steps illustrated in Figs. 2 to 7.

In the first station A, a predetermined amount of edible material 19 is forced into the container through the spout 13. The containers are then moved to the station B, for the performance of the second step of said method illustrated in Fig. 3, in which the containers are lifted so that the spout 14 is forced into the layer of material 19 and a different material 20 is forced from said nozzle to displace the material 19 so that it is raised into an annular wall 21 within the container and thereby forms a cavity 22 while, at the same time, filling said cavity with said different material 20 to the level illustrated in Fig. 3, which provides an overlapping portion 20-a in the form of a flange which appears as a band of contrasting color in the completed article when it is removed from the container. If desired the said material 20 may be forced to fill the cavity 22 only to, or below, the top of the displaced material 19 so that the contrasting material will not be visible at the outside of the finished article and thereby produce a different esthetic result when the finished article is opened into different sections for serving and its interior is exposed.

It will be noted that the spout 14 may be of any required diameter to produce the desired size of cavity 22, or thickness of the wall 21; it being understood that when the material is forced out of said nozzle into the previously placed material 19, the different material will pass out of the end of the nozzle 14 and rise along the opposite sides of said nozzle so that it displaces the material 19. The extent of such displacement is dependent upon the consistency of the different materials and may be controlled, by varying the diameter of the spout 14 or the consistency and amounts of the different materials, to produce the desired thickness of the outer layer from the material 19 as the different material 20 is forced thereinto.

When the second step illustrated in Fig. 3 is completed, the containers are moved to station C in which the third step, illustrated in Fig. 4, is performed. At this station, the container is raised to a predetermined position so that the said spout 15 will be inserted for a predetermined distance into the material 20. The pump 11 is then operated and a different material 23 is forced into the material 20, thereby displacing the said material 20 while forming a cavity 24 therein which is filled with the said material 23 preferably to the level of the material 20 and thereby forming a core for the article.

In the preferred form of my method, when the third step is completed in station C, the containers are moved to station D in which a suitable divider 25, illustrated in Fig. 9, is inserted into the container and the materials therein so as to divide the article into four segmental sections. This divider is preferably constructed of a non-adhering material, such as waxed paper or plastic, so that it may be readily separated from the ice cream after it is removed from the container. If desired, the said divider may be modified for dividing the article into a different number of sections.

When the said divider has been inserted into position, the fourth step, illustrated in Fig. 5, is completed and the containers are moved to the next station E in which the fifth step, illustrated in Fig. 6, is performed. In this step, a predetermined amount of a different material 26 is delivered into the container through the nozzle 16, over the materials previously placed therein, and allowed to extend above the top of the container.

The containers are then moved to station F in which a cover 27 is forced over the container, to close the top thereof, and at the same time squashing the material 26 so that it will form a flat plate over the finished article within the container and the said article is thereby completed.

Although I have described the preferred form of producing spumoni from my improved method, steps 4 and 5 may be omitted thereby eliminating stations D, E and F since the product at the completion of the third step may be considered by trade standards as an acceptable spumoni.

In serving a spumoni produced by the above described method of my invention, the cover 27 is first removed and the container is then inverted upon a plate and raised off the article, leaving the article in inverted position upon the plate. The said article may then be readily divided into the number of sections produced by the divider 25 by simply detaching each section from the divider as it is served.

It will be noted that the comestible articles produced by my improved method are completely sanitary from the standpoint that they are not touched by human hands throughout the performance of the different steps in said method and that the cost of producing such articles has been reduced to a minimum by forming the articles directly within the individual containers, in which they are kept until served, and thereby eliminating the cost of providing special containers and dividers for forming the said articles previous to placing them in the individual containers 17 as heretofore done by conventional methods.

I claim:

1. A method of producing a spumoni ice cream within an individual container which includes forcing the first material into the container to a predetermined level, forcing a second material through a spout injected into the first material and thereby displacing the first material and forming an outer layer with a cavity therein and filling the cavity with the said second material, forcing a third material into the said second material by injecting a spout into the said second material and forcing the third material through said spout to displace the second material into an inner layer and forming a cavity therein and filling said cavity with the third material.

2. A method of producing a spumoni ice cream within an individual container which includes forcing the first material into the container to a predetermined level, forcing a second material through a spout injected into the first material and thereby displacing the first material and forming an outer layer with a cavity therein and filling the cavity with the said second material, forcing a third material into the said second material by injecting a spout into the said second material and forcing the third material through said spout to displace the second material into an inner layer and forming a cavity therein and filling said cavity with the third material to form a core, and placing a separate material in said container over the other materials therein to form a plate for the finished article.

3. The method of producing a comestible article within an individual container which includes forcing a partly congealed edible material into the container to a predetermined level, injecting a spout into said first material and forcing a second material in partly congealed state through said spout and thereby causing displacement of the first material into an outer layer and forming a cavity therein and filling the cavity with the second material, injecting a second spout of smaller diameter into the second material and forcing a third material in partly congealed state into the second material and thereby displacing said second material into a second layer and forming a cavity therein and filling the said cavity in the second layer with the third material and thereby forming a core, inserting a divider into said container for separating the article into a plurality of sections, placing a separate material over the materials and the divider in the container and forming a plate for the article over each of the sections divided therein, and placing a cover for the container over the said material.

References Cited in the file of this patent
UNITED STATES PATENTS

| | | |
|---|---|---|
| Re. 24,299 | De Pasquale | Apr. 13, 1954 |
| 361,930 | Collins | Apr. 26, 1887 |
| 2,429,353 | Gibson | Oct. 21, 1947 |
| 2,663,269 | Kloess | Dec. 22, 1953 |